United States Patent [19]

Lalin et al.

[11] Patent Number: 5,295,396
[45] Date of Patent: Mar. 22, 1994

[54] POSITIVE DISPLACEMENT PISTON FLOW METER FOR AIR FLOW MEASUREMENT

[75] Inventors: Hill S. Lalin, Wayne, N.J.; William T. Fleming, Jr., Marietta, Ga.

[73] Assignee: Gilian Instrument Corporation, West Caldwell, N.J.

[21] Appl. No.: 98,067

[22] Filed: Jul. 28, 1993

Related U.S. Application Data

[63] Continuation-in-part of Ser. No. 32,754, Mar. 17, 1993, which is a continuation of Ser. No. 707,094, May 29, 1991, abandoned.

[51] Int. Cl.$^5$ ............................................. G01F 3/00
[52] U.S. Cl. .................................. 73/861; 73/232
[58] Field of Search ............... 73/861, 239, 3, 232, 73/223, 249, 250

[56] References Cited

U.S. PATENT DOCUMENTS

| | | | |
|---|---|---|---|
| 1,618,206 | 2/1927 | Lamb | 73/239 |
| 4,152,922 | 11/1983 | Francisco, Jr. | 73/3 |
| 4,372,147 | 2/1983 | Waugh et al. | 73/3 |
| 4,481,805 | 11/1984 | Dobesh | 73/3 |
| 4,549,426 | 10/1985 | Erickson | 73/3 |
| 4,794,785 | 1/1989 | Cohrs et al. | 73/3 |
| 5,052,211 | 10/1991 | Cohrs et al. | 73/3 |

Primary Examiner—Richard E. Chilcot, Jr.
Assistant Examiner—R. Biegel
Attorney, Agent, or Firm—E. Lieberstein

[57] ABSTRACT

A positive displacement piston flow meter for measuring air flow comprising a hollow flowtube, preferably arranged in a vertical orientation, having a movable piston disposed in the flowtube for movement between a starting position, preferably at the bottom end of the piston stroke, and an elevated position at the top end of the piston stroke. The piston is reciprocated by means of a pressure relief control valve assembly which controls the ascent and descent of the piston. The piston is physically connected to the pressure relief control valve assembly by means of a flexible string, which causes the piston to automatically close the valve assembly for automatic operation on reaching the bottom end of the piston stroke and to reverse direction.

8 Claims, 8 Drawing Sheets

POSITIVE DISPLACEMENT PISTON FLOW METER FOR AIR FLOW MEASUREMENT

FIELD OF THE INVENTION

This invention is a continuation-in-part of U.S. patent application Ser. No. 08/032,754, filed Mar. 17, 1993, which, in turn, in a continuation of U.S. patent application Ser. No. 07/707,094, filed May 29, 1991, now abandoned, and relates to air flow measuring devices using a positive displacement piston flow meter.

BACKGROUND OF THE INVENTION

The accurate measurement of ambient fluid (air) flow is becoming increasingly more important in the application and control of many processes, as well as in the research laboratory. One of the major applications is in the field of air sampling, where an accurate knowledge of the sampled air quality determines the exposure level to various contaminants. The most widely accepted primary standard method for a gaseous fluid is the bubble flow meter. In the basic form of the bubble flow meter, a soap film is generated from a soap solution, and is propelled by the gas flow under measurement from one end of the flow meter to the other. By timing the rise of the soap film between calibrated volume marks, the volume flow is obtained. Since for all practical purposes, the soap film is massless, it requires almost no force to accelerate the bubble. Furthermore, a seal is always insured by the presence of the bubble. The very nature of the bubble eliminates the friction which is associated with a piston type flow meter. The soap film flow meter is essentially transparent to the flow being measured, having a no-load effect. Accordingly, the soap film flow meter comes closest to meeting the unique requirements of the ideal calibrator.

The measurement of air flow using a positive displacement reciprocating piston flow meter is susceptible to errors based on the following requirements:
1. Initial breakaway friction;
2. Acceleration and deceleration of the piston after breakaway (until equilibrium is reached);
3. Running friction; and
4. Fixed pressure loading determined by the mass of the piston.

The resolution of the above conditions presents a load to the air flow system being measured. The arrangement of the present invention minimizes the initial breakaway friction and acceleration forces of the piston on reversing its direction at the bottom of the piston stroke and, if desired, permits automatic operation without an external power source. An additional advantage of the positive displacement piston flow meter of the present invention is its simplicity in design for reversing the direction of the piston on both the upstroke and downstroke of the piston.

SUMMARY OF THE INVENTION

An improved positive displacement piston flow meter for measuring air flow has been developed in accordance with the present invention, preferably using a vertically oriented flow meter assembly having a movable piston disposed within a precision bore flowtube, for movement from a starting position at or near the bottom end of the flowtube to an elevated position by the flow of air under measurement. The piston is automatically reset to its starting position on reaching the upper end of its vertical stroke by means of a pressure relief control assembly responsive to the piston at the elevated position. The piston is physically connected to the pressure relief control assembly by means of a flexible string.

The positive displacement piston flow meter of the present invention comprises:
(a) a hollow flowtube vertically oriented to form a top end and a bottom end, and having a movable piston disposed therein for movement between said top and bottom end, respectively;
(b) inlet means for connecting one end of said flowtube to an external pump, with the flowtube having ingress and egress to the ambient atmosphere from at least one end thereof;
(c) means for detecting said piston as it moves past two or more predetermined positions along said flowtube from which air flow through said flowtube can be measured; and
(d) a pressure relief control assembly for controlling the ascent and descent of the piston in said flowtube, said pressure relief control assembly comprising: a housing, a chamber within the interior of said housing, and a poppet valve for interconnecting said top end of said flowtube to said chamber, with said poppet valve having a first position for providing a first flow path to said inlet means from said top end of said flowtube to cause said piston to rise, and a second position for providing a se said poppet valve, including a valve stem extending into said flowtube for engaging said piston when said piston reaches a fixed position adjacent to the top end of the flowtube, whereby said poppet valve is automatically switched into said second position, so as to permit said piston to descend from the top end of said flowtube by gravity; magnetic latching means for holding said poppet valve in a fixed position after said piston and said valve stem have disengaged, and means for resetting the poppet valve into said first position, without the use of an external power source.

BRIEF DESCRIPTION OF THE DRAWINGS

Other features and advantages of the present invention will become apparent from the following detailed description of the invention, when read in conjunction with the accompany drawings, of which.

DETAILED DESCRIPTION OF THE INVENTION

Figure 1:
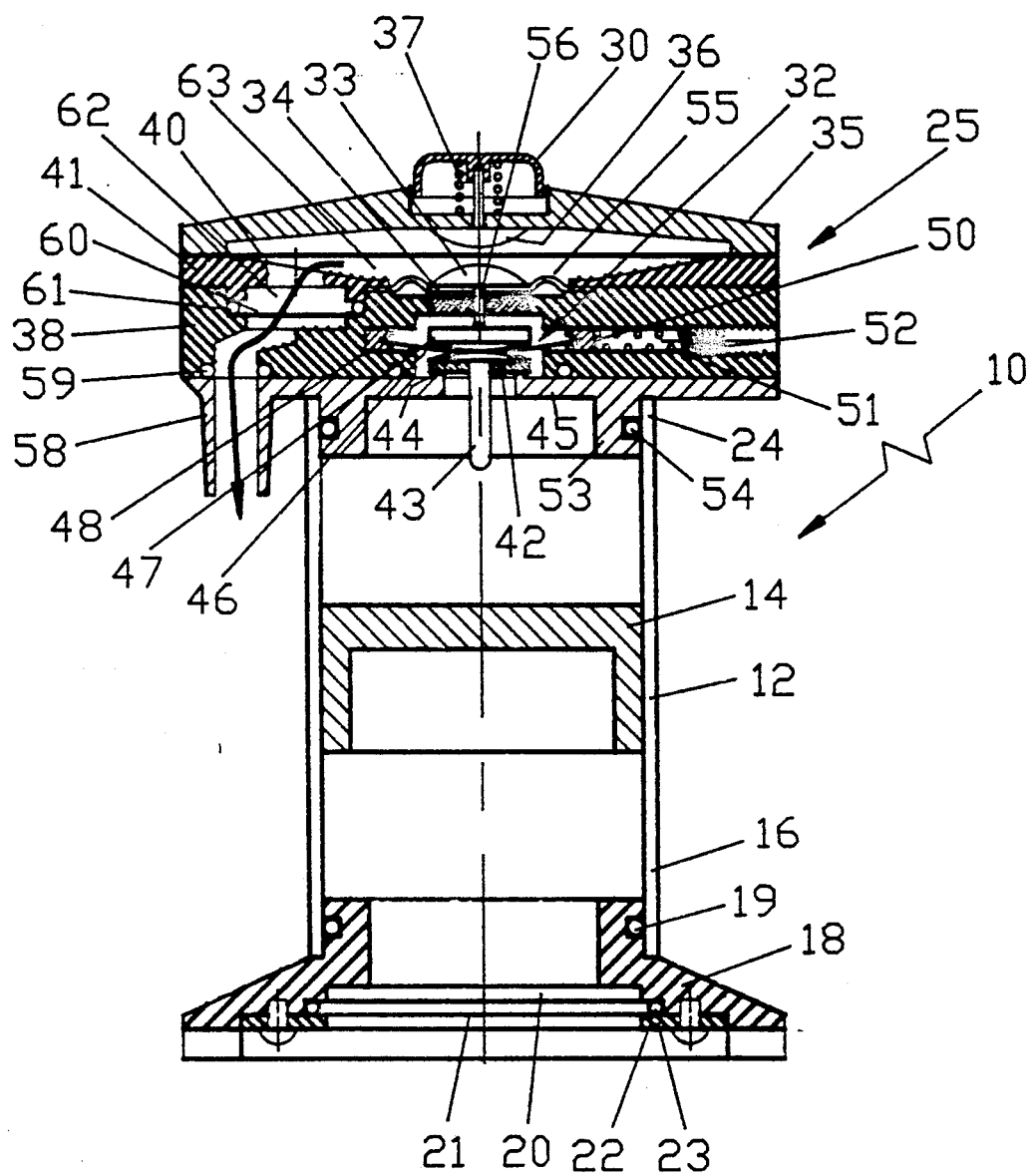
FIG. 1 is a view in vertical section of one embodiment of the flow meter apparatus of the present invention.
Figure 2:
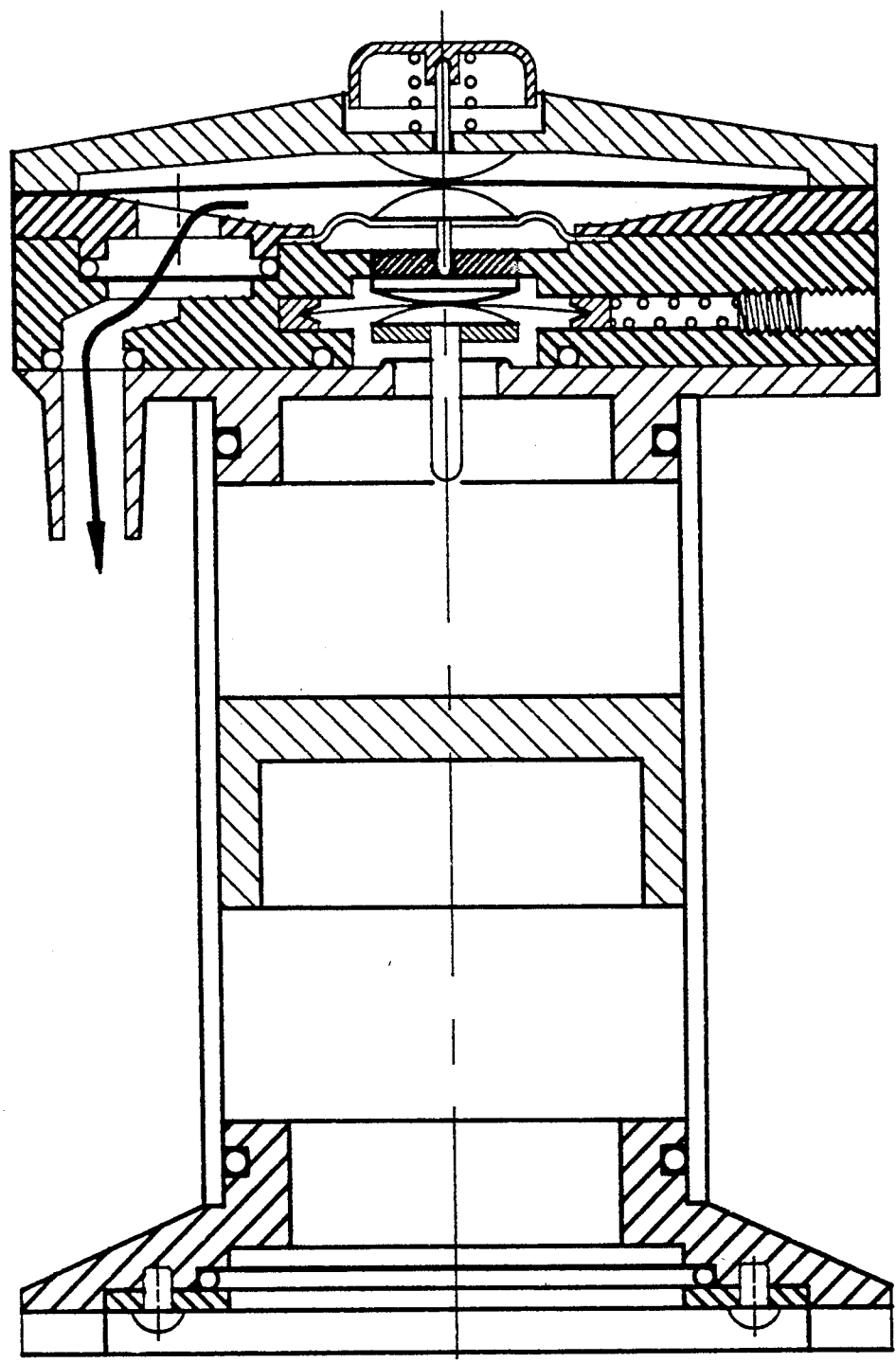
FIG. 2 is a sectional view of the flow meter of FIG. 1, with the poppet valve in the pressure relief control assembly of FIG. 1 shown in the open position.
Figure 3:
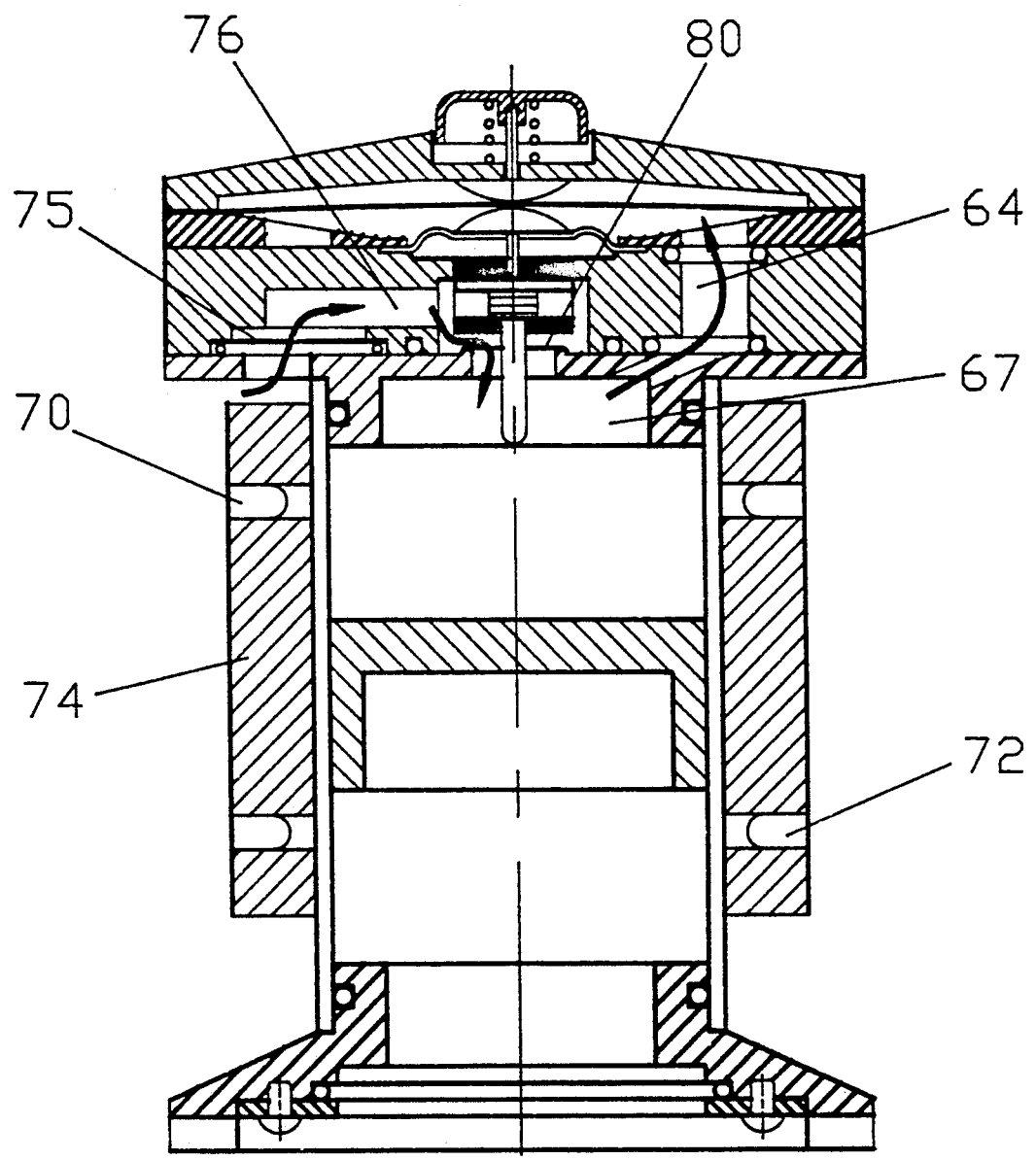
FIG. 3 is a view similar to FIG. 2, with the flow meter rotated ninety degrees (90°)
Figure 6:
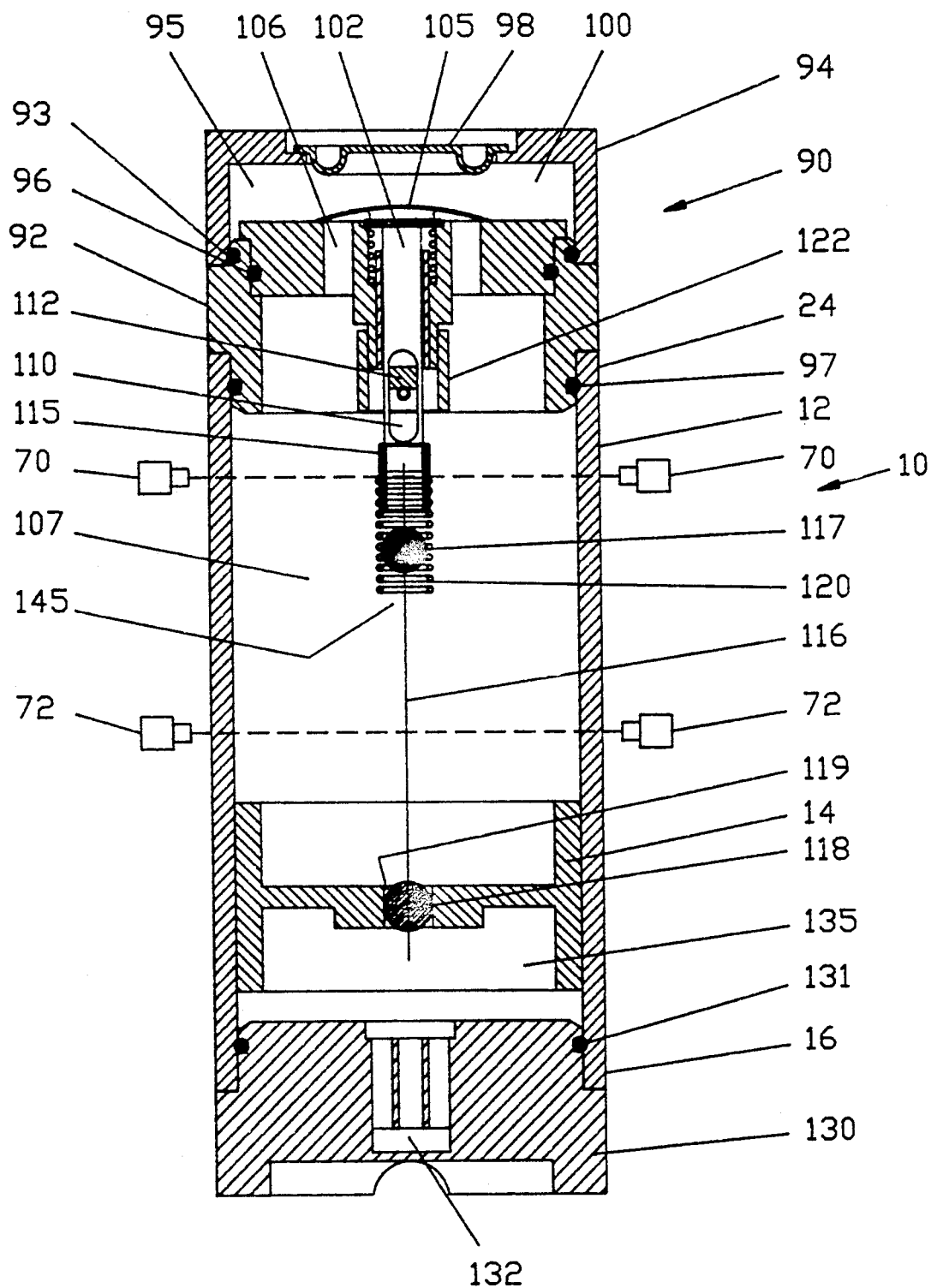
FIG. 6 is a view in vertical section of an alternate embodiment of the flow meter apparatus of the present invention.
Figure 7:
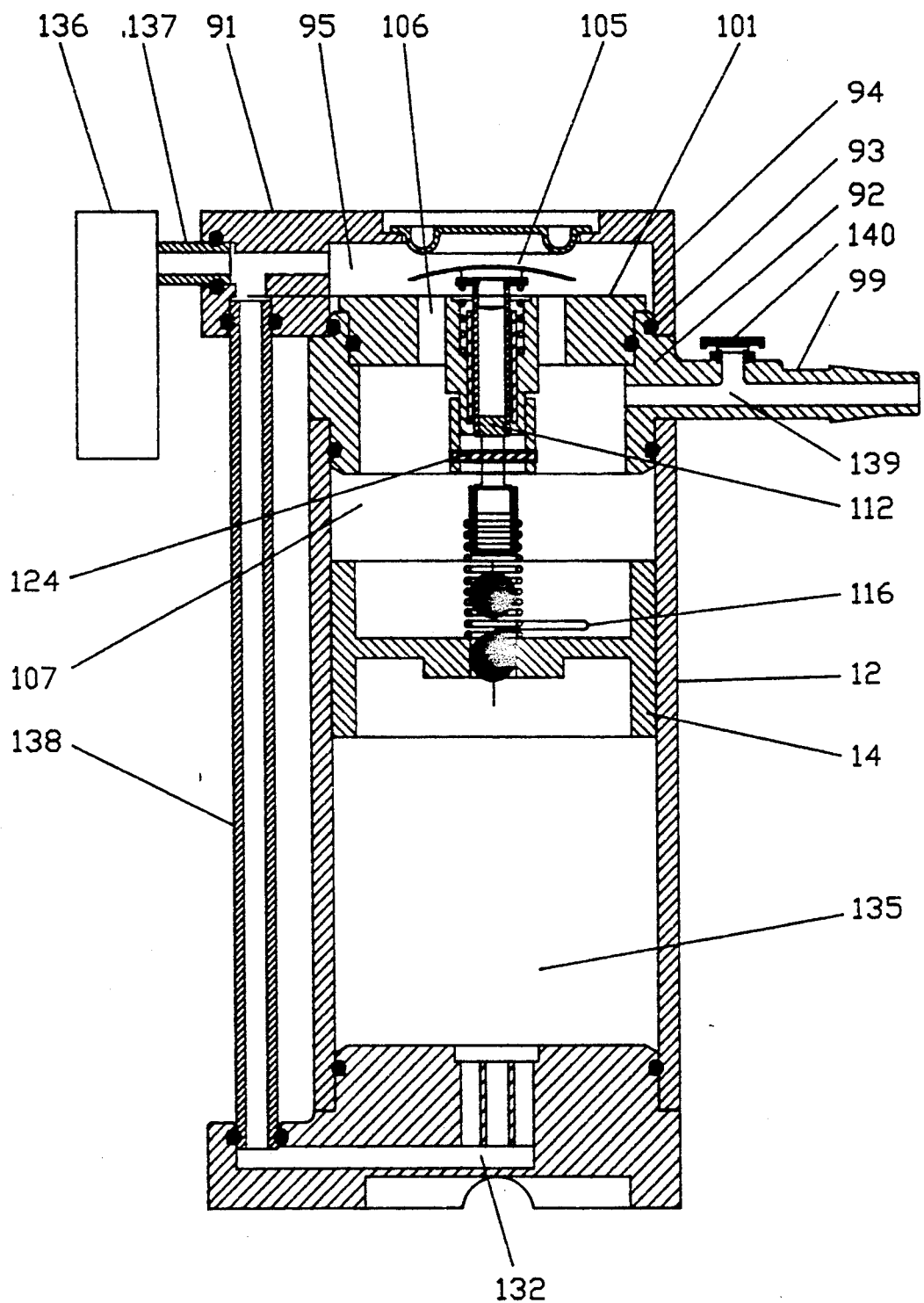
FIG. 7 is a view similar to FIG. 6, with the flow meter apparatus rotated ninety degrees (90°), and with the pressure relief control valve shown in the valve-open position.
Figure 8:
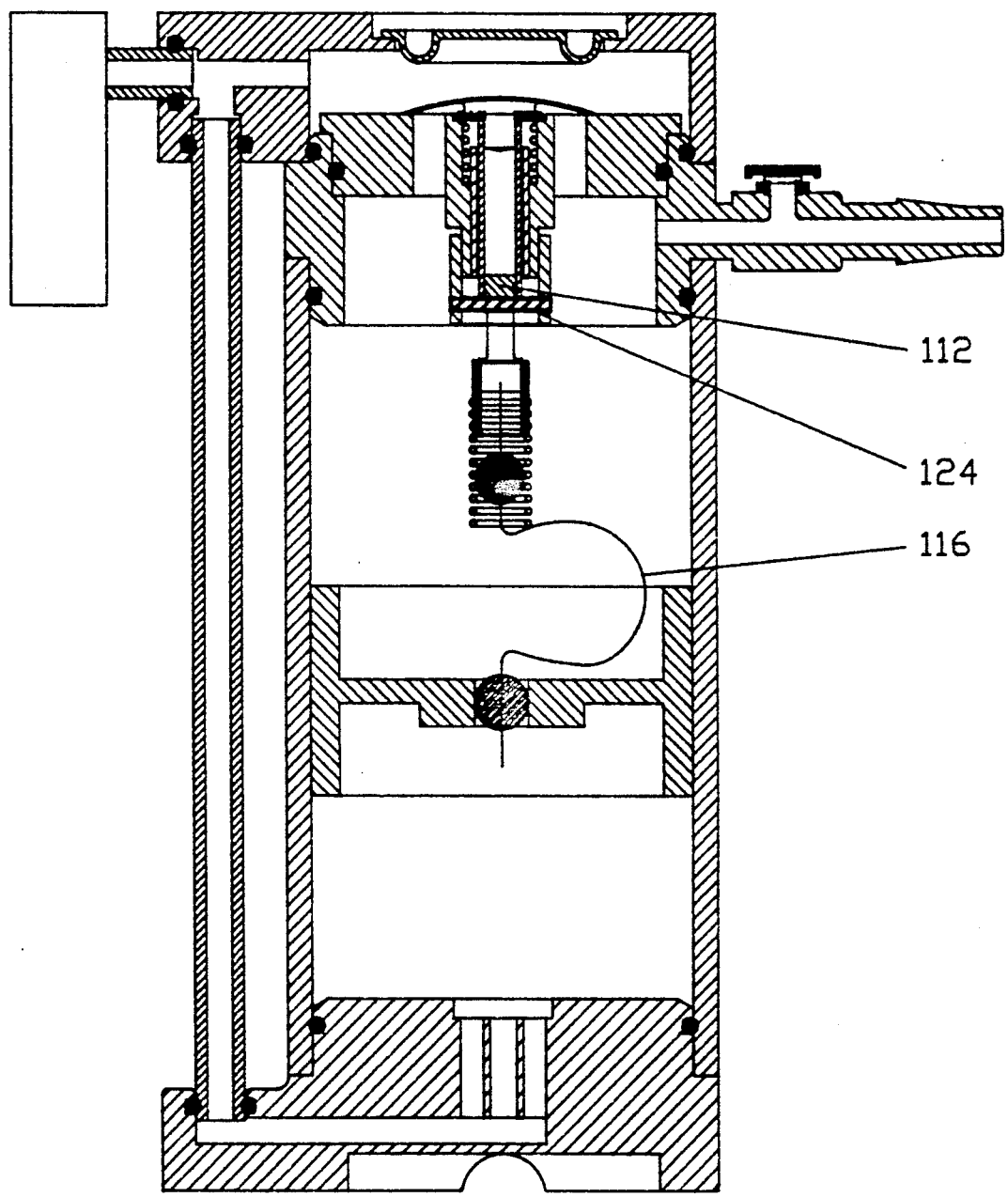
FIG. 8 is a view similar to FIG. 6 in the rotated position of FIG. 7, with the pressure relief control valve closed, and with the piston shown advancing toward the top end of the piston stroke.

The positive displacement flow meter apparatus of the present invention is identified by the reference numeral "10" in the embodiment of FIGS. 1-3, and in the alternate embodiment of FIGS. 6-8, with the same reference numbers used in each of the figures to identify corresponding parts. The flow meter (10), shown in FIGS. 1 to 3, comprises a hollow cylindrical open-ended flowtube (12), which is a precision bore, glass tube, with a lightweight, smooth, surface piston (14) fitted therein to a tight tolerance so as to provide substantially frictionless piston movement. The flowtube (12) is supported in a substantially vertical position, with its bottom end (16) mounted on a base platform (18) and sealed by an O-ring (19). The base platform (18) has an inlet opening (20) for providing access to the atmosphere. An air filter (21) is used to filter air entering through the inlet opening (20). The air filter (21) is held in place by a retaining plate (23) connected to the base platform (18) and sealed by an O-ring (22).

A pressure relief control assembly (25) is mounted on the top end (24) of the flowtube (12) for controlling the directional movement of the piston (14) within the flowtube (12). The pressure relief control assembly (25) includes a manually operated push button switch (30), a poppet valve (32), a poppet valve actuator (33), and a latching member (34). The manually operated push button switch (30) is affixed to a cover plate (35), and includes a contactor (36) which engages the poppet valve actuator (33) to close the poppet valve (32) upon depressing the switch (30), and a spring (37) for resetting the push button switch (30) on its release. The cover plate (35) is affixed to the body (38) of the control assembly (25) by any conventional means, such as screws (not shown). A flexible diaphragm (40) is supported by a retaining plate (41) connected between the cover plate (35) and the body (38). The diaphragm (40) attenuates pulsations in air flow, as will be explained hereafter in greater detail.

The poppet valve (32) comprises a valve head (42), a stem (43), a valve seat (44), a valve seat plate (45), a leaf spring (46), and a steel support plate (47). The leaf spring (46) is supported by an anchor pivot (48) on one side thereof, and a spring-loaded pivot (50) on the opposite side. The spring-loaded pivot (50) may be manually adjusted by a pivot spring (51) through a spring-adjusting screw (52). The valve seat plate (45) is affixed through screws (not shown) to the body (38) of the control assembly (25), and is configured to provide a depending extension (53), over which the top end (24) of the flowtube (12) is press-fitted and sealed with an O-ring (54).

The poppet valve actuator (33) is moutned on a movable diaphragm (55) supported between the retaining plate (41) and the body (38), and includes a stem (56) which extends through the latching member (34) into contact with the steel support plate (47). The latching member (34) is a permanent magnet.

The control assembly (25) further includes an outlet fitting (58) for attachment to the suction side of a conventional pump to draw an airstream through the control assembly (25), for raising the movable piston (14) in the flowtube (12) when depressing the push button switch (30). The outlet fitting (58) is sealed through an O-ring (59). The air filter (60), sealed with an O-ring (61), is supported within the air passageway (62) in the body (38) of the control assembly (25) to filter the airstream. The passageway (62) communicates with the diaphragm chamber (63) which, in turn, communicates through a passageway (64), as shown in FIG. 3, and through the opening (65) into the open space (67) between the piston (14) and the top end (24) of the flowtube (12).

Figure 4:
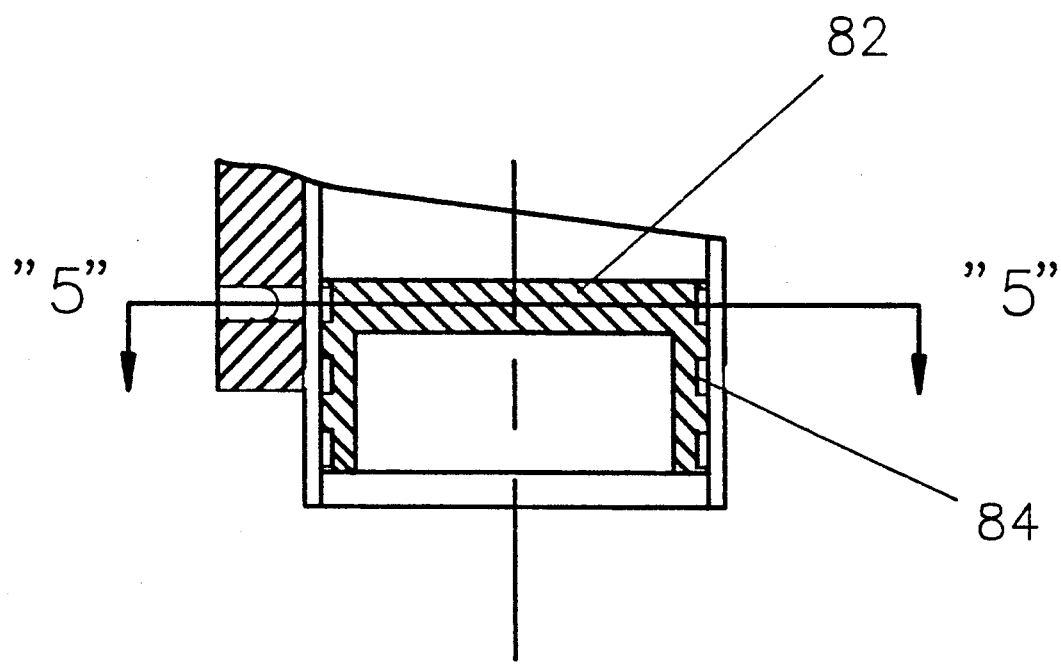
FIG. 4 is a view of an alternate embodiment of the piston and LED arrangement of FIG. 2.
Figure 5:
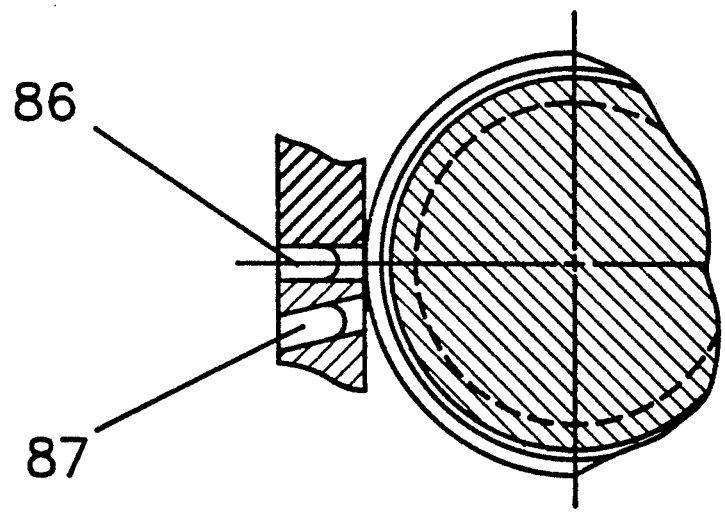
FIG. 5 is a sectional view taken along the lines 5—5 of FIG. 4.

Two sets of conventional optical LED photoelectrical sensor elements (70) and (72) are mounted in a block (74) surrounding the flowtube (12). The photoelectric sensor elements (70) and (72) are spaced a fixed distance apart along the flowtube (12) and operate to measure the displaced transmit time of the leading or trailing edge of the piston (14) as it moves between the two sensor locations. The operation of the photoelectric elements (70) and (72) and the method of calculating the transmit time between sensor locations is conventional. An alternate embodiment for arranging the LED elements to solicit data as the piston (14) moves is shown in FIGS. 4 and 5 and will be discussed hereafter.

In the operation of the embodiment of FIGS. 1-3, the push button switch (30) is momentarily depressed, which causes the stem (56) of the poppet valve actuator (33) to press down on the steel support plate (47). This, in turn, causes the leaf spring (46) to snap into the stable position shown in FIG. 1, with the valve head (42) engaging the valve seat (44). In this position, the poppet valve (32) is closed and air drawn from the open space (67) into the flowtube (12) will cause the piston (14) to rise from its at-rest position at the bottom end (16) of the flowtube (12). The piston (14) will advance at a speed proportional to the flow of air through the control assembly (25). On contacting the stem (43) of the valve head (42), the poppet valve (32) is forced open and the leaf spring (46) is caused to snap into the latched position, as shown in FIG. 2.

The tension of the leaf spring (46) may be manually adjusted by adjustment of the screw (52). The permanent magnet latching member (34) functions to assist the leaf spring (46) in moving to the latched position of FIG. 2, and to maintain the leaf spring (46) in this position until the push button switch (30) is actuated. With the poppet valve (32) open, air flow through the fitting (58) communicates, as shown in FIG. 3, through an air filter (75), cavity (76), and through the valve opening (80) to the open space (67) at the top end (24) of the flowtube (12).

As indicated heretofore, the open space (67) is in direct communication with the diaphragm chamber (63) through the opening (65) and passageway (64). Thus, in the poppet valve (32) open position, the piston (14) will fall freely under gravity from the top end (24) to the bottom end (16), and will remain there until the push button switch (30) is again activated. Any pulsations or sudden changes in the rate of air flow through the diaphragm chamber (63) will deflect the diaphragm (40) to attenuate the pulsation.

In FIGS. 4 and 5, the piston (82), which corresponds to piston (14) in FIGS. 1-3, has a plurality of reflective bands or grooves (84) formed about its circumference. The photoelectric devices (86) and (87) represent an infrared transmitter and receiver, respectively, and are arranged in close proximity to sense the presence of a band or groove (84) by detection of the reflected infrared signal. The measurement of the flow is calculated in the same way as for the arrangement of FIGS. 1–3. This feature may be added to the embodiment previously described in FIGS. 1–3.

An alternative embodiment of the present invention, preferably intended to automatically reciprocate the piston (14) in the flowtube (12), is shown in FIGS. 6, 6A, 7, and 8, respectively, with the same reference numbers used in the above figures when identifying parts corresponding to those identified in FIGS. 1–3. The piston (14) is arranged in the flowtube (12) in a manner identical to that shown in FIG. 1, to be reciprocated from a starting position adjacent the bottom end (16) of the flowtube (12) to an elevated position adjacent the top end (24), by means of a pressure relief control assembly (90).

The pressure relief control assembly (90) comprises a housing (91) having an annular member (92) securely mounted to the top end (24) of the flowtube (12), a cover (94) fitted over the annual member (92) to form a chamber (95), and a poppet valve (100) for interconnecting the chamber (95) and the flowtube (12), based on whether the poppet valve is open or closed. The cover (94) is removably sealed to the annular member (92) by an O-ring (93). Additional O-rings (96) and (97) form seals between the poppet valve (100) and the annular member (92), and between the annular member (92) and the flowtube (12). A flexible diaphragm (98) is located in the cover (94) above the chamber (95).

The poppet valve (100) comprises a valve body (101) having a movable valve stem (102), slidably mounted in a cylindrical sleeve (103) fitted within a bore (104) formed substantially in the center of the valve body (101). The movable valve stem (102) has a flexible valve head (105) which, in the position shown in FIG. 6, covers a passageway or channel (106) extending through the body (101), leading into the upper piston chamber (107) of the flowtube (12). A compression spring (108) is mounted around the sleeve (103) within the bore (104), between the flexible head (105) and the valve body (101).

The movable valve stem (102) is an elongated, tubular member having an oval slot (110) at its distal end (111), in which a permanent magnet (112) is inserted in a fixed position. A mounting bracket (115) of cylindrical geometry extends from the distal end (111) of the rod (102) into the upper piston chamber (107) of the flowtube (12). A flexible string (116) is secured at each opposite end thereof to corresponding members (117) and (118), with the member (117) supported in a fixed position within a compression spring (120) which is mounted over the bracket (115) and with the member (118) affixed to the piston (14). The ends of the flexible string (116) is embedded in the members (117) and (118), thereby physically connecting the piston (14) to the poppet valve (100). The member (118) may be press-fitted in an opening (119) of the piston (14) or otherwise physically connected thereto. The compression spring (120) has a free end (145) extending into the piston chamber (107).

Figure 6A:
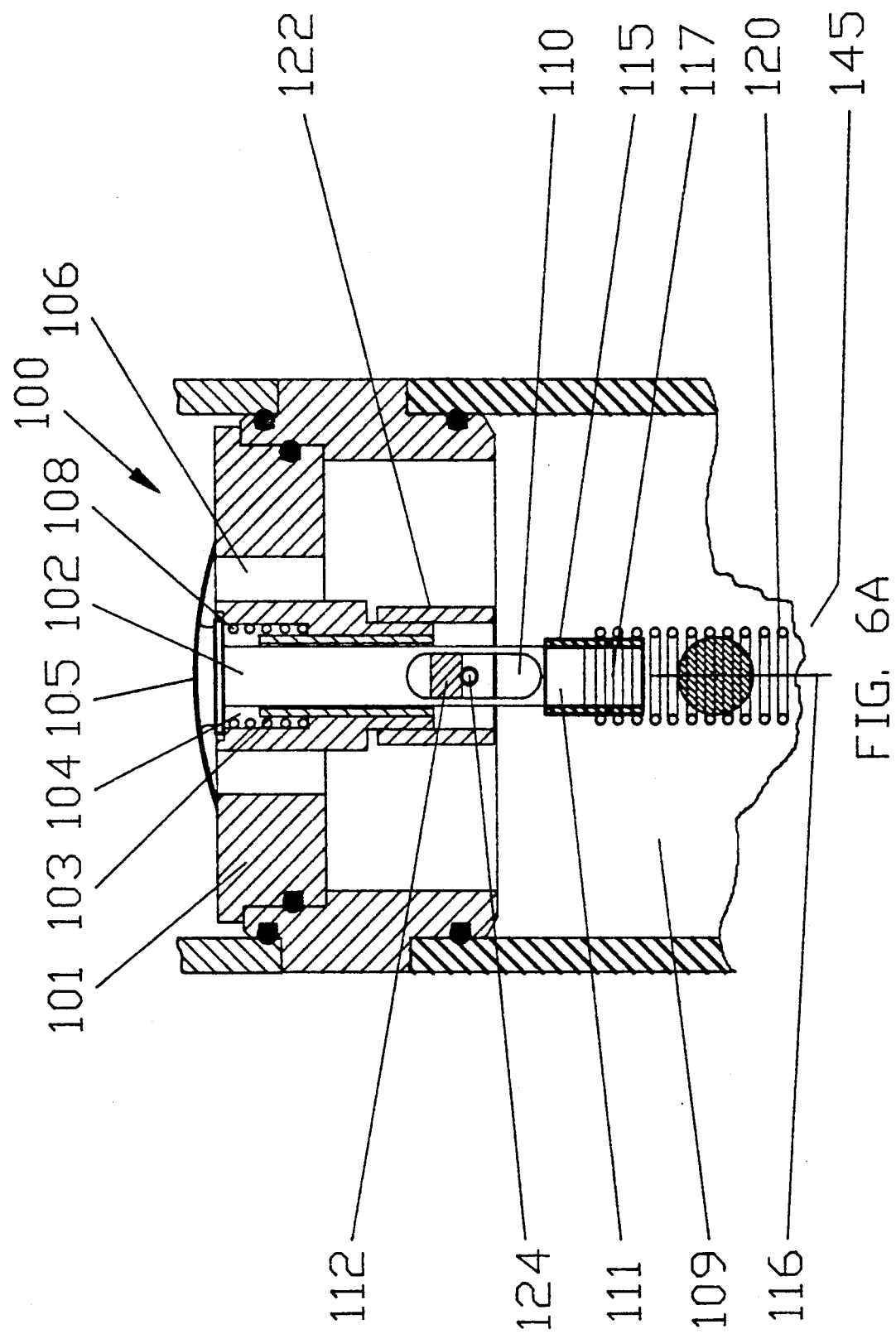
FIG. 6A is an exploded view of the pressure relief control assembly of FIG. 6, with the pressure relief control valve shown in the valve-closed position.

A cylindrical collar (122) is mounted over a depending section of the valve body (101) surrounding the permanent magnet (112). The collar (122) has a steel pin (124) which extends through the oval slot (110) adjacent to the permanent magnet (112) to form a magnetic latch for holding the valve stem (102) in the valve-closed position, as shown in FIGS. 6, 6A, and 8, with the flexible valve head (105) covering the channel (106) against the force of the compression spring (108). In the valve-closed position, the piston (14) is held suspended from the spring (116) at a location adjacent the bottom end of the flowtube (12). This represents the starting position of the piston (14), which is preferably slightly above the base support (130) for the flowtube (12). The base support (130) corresponds to the base platform (18) of FIG. 1, with the flowtube sealed at the bottom end (16) by an O-ring (131).

As is more clearly shown in FIG. 7, the base support (130) has an access passageway (132) extending therethrough, to provide direct access between the lower piston chamber (135) and the ambient atmosphere through an air filter (136). The air filter (136) is used, in the embodiment of FIG. 7, to filter air from the common inlet (137) through the vertical standpipe (138) to the access passageway (132), as well as to the chamber (95) in the housing (91). A boss (99) extends from the annular member (92) of the housing (91) to function as an inlet coupling for attachment to an external pump (not shown), preferably on its suction side. The boss (99) has an internal passageway (139) communicating with the upper piston chamber (107). A manually operated vent valve (140) is mounted on the boss (99) to permit manual activation of the unit (10) of FIGS. 6–8.

The optical LED photoelectric sets of sensor elements (70) and (72) are mounted in fixed positions adjacent to surrounding the flowtube (12), and operate as explained earlier in connection with FIGS. 1–3, to measure the displaced transit time of the piston (14) as it moves between the fixed sensor positions along the flowtube.

The unit (10) of FIGS. 6–8 operates in a substantially similar fashion to the corresponding flow meter (10) of FIG. 1 for controlling the ascent of the piston (14) in the flowtube (12). The vent valve (140) is depressed and air is suctioned by the external pump (not shown) from the upper piston chamber (107) through the boss (99). As the air evacuates the upper piston chamber (107), the piston (14) rises and air is drawn from the ambient atmosphere through the inlet air filter (136), down the vertical standpipe (138), and into the lower piston chamber (135) via the access passageway (132) in the base support (130). Thus, only filtered air enters the flowtube (12). The piston (14) continues to rise until it physically makes contact with the spring (120). The spring (120) is forced to compress until the compression force overcomes the magnetic latching force between the steel pin (124) and the permanent magnet (112). At this point, the valve stem (102) rises, opening up the poppet valve assembly (100) to the valve-open position, as shown in FIG. 7. The compression spring (108) surrounding the rod (102) will keep the valve (100) fully opened until the valve (100) is forcibly closed. In the valve-open position, the ambient air drawn through the air inlet filter (136) passes through the chamber (95) and through the open channel (106) into the upper piston chamber (107), from whence it is withdrawn by the external pump (not shown) through the passageway (139) in the boss (99). The piston (14) will now begin to drop by gravity, due to its own weight, and continue to fall, until the weight of the piston (14) tenses the string (116) attached to the valve assembly (100). This automatically pulls the valve stem (102) to the valve-closed position, which relatches the magnet (112) to the steel pin (124) for holding the valve (100) in the valve-closed position.

Of key importance to the invention is that the tension on the string (116), when the piston (14) hits bottom, causes the piston (14) to rebound to its upward position. This action overcomes the initial breakaway friction, which would otherwise be encountered during acceleration of the piston, to achieve a state of constant velocity during ascent of the piston (14). Once constant velocity is achieved, the only losses are those associated with the mass and diameter of the piston (14).

The ease with which the piston (14) reverses its direction and moves upward without external assistance (i.e., without loading down the external pump) is based upon the ability of the piston (14) to rebound when it reaches the end of its downstroke. This is adjustable by positioning the ball member (117) relative to the free end (145) of the spring (120). By fine tuning the position of the ball member (117) little, if any, acceleration of the piston (14) is required to initiate the upstroke cycle. Without the need for acceleration of the piston, a no-load condition on the pump is approximated. The placement of the ball member (117) relative to the spring free end (145) controls the acceleration/deceleration characteristics of the piston (14).

The latching of the magnet (112) is adjustable by changing the vertical position of the collar (122) on the valve body (101). The position of the collar (122) controls the position of the steel pin (124) relative to the magnet (112) for both the valve open and closed positions. If the collar (122) is moved downwardly, less force is necessary to open the valve from the closed position. Conversely, if the collar (122) is adjusted upward, less force is necessary to close the valve from the valve open position.

What is claimed:

1. A positive piston flow meter for use in measuring air flow comprising:
   (a) a hollow flowtube vertically oriented to form a top end and a bottom end, and having a movable piston disposed therein for movement between said top and bottom end, respectively;
   (b) inlet means for connecting one end of said flowtube to an external pump, with said flowtube having ingress and egress to the ambient atmosphere from at least one end thereof;
   (c) means for detecting said piston as it moves past at least two predetermined positions along said flowtube from which air flow through said flowtube can be measured; and
   (d) a pressure relief control assembly for controlling the ascent and descent of the piston in said flowtube, said pressure relief control assembly comprising: a housing, a chamber within the interior of said housing, and a poppet valve for interconnecting said said flowtube to said chamber, with said poppet valve having a first position for providing a first flow path to said inlet means from said top end of said flowtube to cause said piston to rise, and a second position for providing a second flow path from said chamber to said inlet means to cause said piston to fall; and with said poppet valve, including a valve stem extending into said flowtube for engaging said piston when said piston reaches a fixed position adjacent the top end of the flowtube, whereby said poppet valve is automatically switched into said second position to permit said piston to descend by gravity from the top end of said flowtube; latching means for holding said poppet valve in a fixed position after said piston and said valve stem have disengaged, and means for resetting the poppet valve into said first position.

2. A positive piston flow meter, as defined in claim 1, wherein said means for resetting the poppet valve is a manually operated switch.

3. A positive piston flow meter, as defined in claim 1, wherein said flow meter is automatically operated, with said means for resetting said poppet valve comprising a flexible string, physically connecting said poppet valve and said piston.

4. A positive piston flow meter, as defined in claim 3, wherein said latch means comprises a permanent magnet mounted in said valve stem, and means for holding a steel member in a stationary position relative to said magnet.

5. A positive piston flow meter as defined in claim 4, wherein the position of said means for holding said steel member is adjustable to vary the position of said steel member relative to said magnet.

6. A positive piston flow meter as defined in claim 4, wherein said flexible string is connected at one end to a member mounted in a compression spring extending from said valve stem such that said flexible string is suspended from said compression spring.

7. A positive piston flow meter as defined in claim 6 wherein said compression spring has a free end extending into said flowtube with the position of said member in said compression spring being adjustable relative to said free end.

8. A positive piston flow meter, as defined in claim 6, wherein said poppet valve further comprises a flexible valve head, a valve body, and a passageway extending through said valve body for providing access through said poppet valve to said chamber.

* * * * *